United States Patent
Jung et al.

(10) Patent No.: US 12,107,262 B2
(45) Date of Patent: Oct. 1, 2024

(54) POSITIVE ELECTRODE FOR SECONDARY BATTERY COMPRISING FLAKE GRAPHITE AND SECONDARY BATTERY COMPRISING THE SAME

(71) Applicant: LG Energy Solution, Ltd., Seoul (KR)

(72) Inventors: Byounghyo Jung, Daejeon (KR); Ilhong Kim, Daejeon (KR); Minchul Jang, Daejeon (KR); Insung Uhm, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 504 days.

(21) Appl. No.: 17/433,124

(22) PCT Filed: Nov. 25, 2020

(86) PCT No.: PCT/KR2020/016763
§ 371 (c)(1),
(2) Date: Aug. 23, 2021

(87) PCT Pub. No.: WO2021/107586
PCT Pub. Date: Jun. 3, 2021

(65) Prior Publication Data
US 2022/0149350 A1 May 12, 2022

(30) Foreign Application Priority Data
Nov. 29, 2019 (KR) .................. 10-2019-0157647

(51) Int. Cl.
*H01M 4/36* (2006.01)
*H01M 4/02* (2006.01)
(Continued)

(52) U.S. Cl.
CPC .......... *H01M 4/364* (2013.01); *H01M 4/366* (2013.01); *H01M 4/505* (2013.01); *H01M 4/525* (2013.01);
(Continued)

(58) Field of Classification Search
CPC ...... H01M 4/364; H01M 4/366; H01M 4/505; H01M 4/525; H01M 4/625; H01M 2004/028
See application file for complete search history.

(56) References Cited

U.S. PATENT DOCUMENTS 9,184,443 B2  11/2015 Lee et al.
10,056,613 B2  8/2018 Kang et al.
(Continued)

FOREIGN PATENT DOCUMENTS

CN   107949938 A   4/2018
CN   108352504 A   7/2018
(Continued)

OTHER PUBLICATIONS

International Search Report for Application No. PCT/KR2020/016763, mailing Mar. 12, 2021, 3 pages.
(Continued)

*Primary Examiner* — Aiqun Li
(74) *Attorney, Agent, or Firm* — Lerner David LLP

(57) ABSTRACT

Provided is a positive electrode for secondary battery including:
  a first positive electrode mixture layer formed on at least one surface of a positive electrode current collector and including a first positive electrode active material; and
  a second positive electrode mixture layer formed on the first positive electrode mixture layer and including a second positive electrode active material
  wherein the first positive electrode active material and the second positive electrode active material include a lithium nickel-based transition metal oxide represented by the following Chemical Formula 1, and
(Continued)

wherein the first positive electrode mixture layer contains a flake graphite as an additive.

$$Li_aNi_{1-b}M_bO_{2-x}A_x \qquad (1)$$

in the above formula,

M is at least one selected from the group consisting of Ti, Mg, Al, Zr, Mn and Co, A is an oxygen-substituted halogen, $1.00 \leq a \leq 1.05$, $0 < b \leq 0.2$, and $0 \leq x \leq 0.01$.

12 Claims, 1 Drawing Sheet

(51) Int. Cl.
  *H01M 4/505* (2010.01)
  *H01M 4/525* (2010.01)
  *H01M 4/62* (2006.01)
  *H01M 10/0525* (2010.01)

(52) U.S. Cl.
  CPC ....... *H01M 4/625* (2013.01); *H01M 10/0525* (2013.01); *H01M 2004/021* (2013.01); *H01M 2004/028* (2013.01); *H01M 2220/20* (2013.01); *H01M 2220/30* (2013.01)

(56) References Cited

U.S. PATENT DOCUMENTS

| | | | |
|---|---|---|---|
| 2005/0170251 A1 | 8/2005 | Jung et al. |
| 2008/0050655 A1 | 2/2008 | Chu et al. |
| 2011/0003204 A1 | 1/2011 | Jung et al. |
| 2011/0168550 A1 | 7/2011 | Wang et al. |
| 2013/0288118 A1 | 10/2013 | Kim et al. |
| 2015/0010819 A1 | 1/2015 | Lee et al. |
| 2017/0133682 A1 | 5/2017 | Kang et al. |
| 2018/0241036 A1 | 8/2018 | Jo et al. |
| 2018/0301740 A1 | 10/2018 | Min et al. |
| 2019/0020057 A1 | 1/2019 | Fujisawa |
| 2019/0036154 A1 | 1/2019 | Kim et al. |
| 2019/0267621 A1 | 8/2019 | Lee et al. |
| 2020/0028177 A1 | 1/2020 | Kim et al. |
| 2020/0083524 A1 | 3/2020 | Baek et al. |
| 2020/0119341 A1 | 4/2020 | Baek et al. |
| 2020/0343536 A1 | 10/2020 | Suh et al. |

FOREIGN PATENT DOCUMENTS

| | | |
|---|---|---|
| CN | 108475772 A | 8/2018 |
| CN | 109863628 A | 6/2019 |
| JP | H0927344 A | 1/1997 |
| JP | 2005158737 A | 6/2005 |
| JP | 2012209161 A | 10/2012 |
| JP | 2013519187 A | 5/2013 |
| JP | 2013232414 A | 11/2013 |
| JP | 2016009543 A | 1/2016 |
| JP | 2018536253 A | 12/2018 |
| JP | 2019501492 A | 1/2019 |
| JP | 2019140054 A | 8/2019 |
| KR | 20050048739 A | 5/2005 |
| KR | 20080019533 A | 3/2008 |
| KR | 20120126021 A | 11/2012 |
| KR | 20150006283 A | 1/2015 |
| KR | 20170053123 A | 5/2017 |
| KR | 20170063373 A | 6/2017 |
| KR | 20170141141 A | 12/2017 |
| KR | 20190012839 A | 2/2019 |
| KR | 20190041715 A | 4/2019 |
| KR | 20190051864 A | 5/2019 |
| KR | 20190064462 A | 6/2019 |
| WO | 2017057078 A1 | 4/2017 |
| WO | 2017149927 A1 | 9/2017 |

OTHER PUBLICATIONS

Extended European Search Report for Application No. 20893418.2. dated Apr. 20, 2022. 9 pgs.

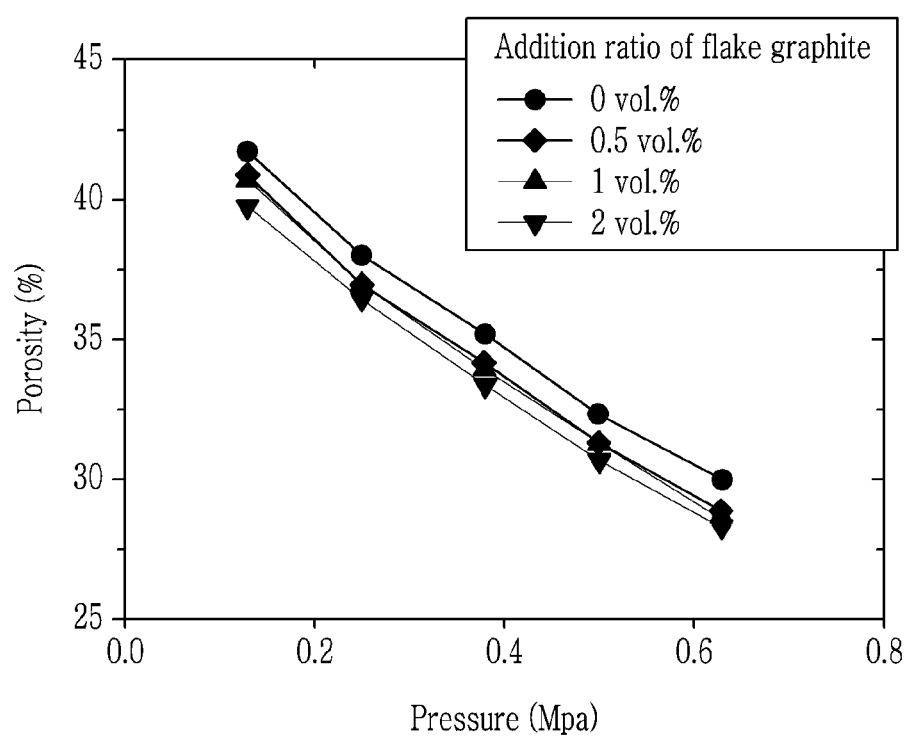

POSITIVE ELECTRODE FOR SECONDARY BATTERY COMPRISING FLAKE GRAPHITE AND SECONDARY BATTERY COMPRISING THE SAME

CROSS REFERENCE TO RELATED APPLICATIONS

This application is a national phase entry under 35 U.S.C. § 371 of International Application No. PCT/KR2020/016763, filed Nov. 25, 2020, which claims priority to Korean Patent Application No. 10-2019-0157647 filed on Nov. 29, 2019, the disclosures of which are incorporated herein by reference in their entirety.

TECHNICAL FIELD

The present disclosure relates to a positive electrode for secondary battery comprising flake graphite, and a secondary battery comprising the same.

BACKGROUND ART

Due to the rapid increase in the use of fossil fuels, the demand for the use of alternative energy or clean energy is increasing, and as part thereof, the fields that are being studied most actively are the fields of power generation and power storage using electrochemistry.

At present, a secondary battery is a representative example of an electrochemical device that utilizes such electrochemical energy, and the range of use thereof tends to be gradually expanding.

Recently, with the increase of the technological development and demand for mobile devices such as portable computers, portable phones, and cameras, demand for secondary batteries as an energy source rapidly increases. Among such secondary batteries, many studies have been conducted on a lithium secondary battery that exhibit high energy density and operating potential, have a long cycle life and a low self-discharge rate, and are commercialized and widely used.

In addition, as interest in environmental issues grows, studies are frequently conducted on an electric vehicle, a hybrid electric vehicle, etc. which can replace a vehicle using fossil fuels such as a gasoline vehicle and a diesel vehicle, which are one of the main causes of air pollution. Although a nickel metal hydride secondary battery is mainly used as a power source for the electric vehicle and the hybrid electric vehicle, research on the use of a lithium secondary battery having high energy density and discharge voltage is actively being conducted, a part of which are in the commercialization stage.

As the demand for lithium secondary batteries is increasing rapidly as described above, there are many studies being conducted in order to improve the performance of secondary batteries, and the need for secondary batteries capable of exhibiting a higher energy density per volume is growing more and more.

At this time, in order to realize a high energy density, as long as the positive electrode is not replaced with a material exhibiting high capacity, it is inevitable to realize a high load amount. Therefore, in order to improve the energy density per volume, it is necessary to minimize the voids of the positive electrode at a high load amount.

Meanwhile, during the manufacture of such a positive electrode, the process of rolling an electrode is performed during the electrode process. In this case, not only the stress due to rolling is relatively more concentrated on the upper part of the electrode than the lower part of the electrode, but also rolling is well performed in the upper part of the electrode, which causes a problem that the porosity differs between the upper part and the lower part of the electrode.

Therefore, there is an urgent need to develop a technique that solves the above-mentioned problems and thus can reduce the porosity at a high load amount of the positive electrode and have a uniform porosity as a whole.

DETAILED DESCRIPTION OF THE PRESENT DISCLOSURE

Technical Problem

The present disclosure has been designed to solve the above-mentioned problems, and an object of the present disclosure is to provide a positive electrode for secondary battery that minimizes the porosity in the positive electrode with a high load amount and increases the uniformity as a whole, thus increasing the energy density per volume, and a secondary battery comprising the same

Technical Solution

It should be understood that the terms and wordings used herein should not be construed to be limited to general or lexical means and the concepts of the terms may be defined to describe the present disclosure made by the inventor(s) the best way, and based on such principle, the terms and wordings should be constructed to have meanings and concepts that comply with the technical spirit of the present disclosure.

A positive electrode for a secondary battery according to an embodiment of the present disclosure is provided comprising:
 a first positive electrode mixture layer formed on at least one surface of a positive electrode current collector and including a first positive electrode active material; and
 a second positive electrode mixture layer formed on the first positive electrode mixture layer and including a second positive electrode active material,
 wherein the first positive electrode active material and the second positive electrode active material include a lithium nickel-based transition metal oxide represented by the following Chemical Formula 1, and
 wherein the first positive electrode mixture layer contains a flake graphite as an additive.

$$Li_aNi_{1-b}M_bO_{2-x}A_x \qquad (1)$$

in the above formula,
M is at least one selected from the group consisting of Ti, Mg, Al, Zr, Mn and Co,
A is an oxygen-substituted halogen,
$1.00 \leq a \leq 1.05$, $0 < b \leq 0.2$, and $0 \leq x \leq 0.01$.

In this case, the lithium nickel-based transition metal oxide of the first positive electrode active material and the second positive electrode active material may have a bimodal structure in which large particles having a diameter (D50) of 10 to 19 μm and small particles having a diameter (D50) of 3 to 7 μm are mixed, wherein the large particles and the small particles may be mixed in a ratio of 7:3 to 3:7 based on the weight.

Further, in the first positive electrode mixture layer and the second positive electrode mixture layer, the lithium nickel-based transition metal oxide may be contained in an amount of 97% to 99% by weight based on the total weight of the respective positive electrode mixture layers.

A total load amount of the first positive electrode mixture layer and the second positive electrode mixture layer may be 3 to 8 mAh/cm².

Therefore, in the positive electrode with such a high load amount, the flake graphite contained for achieving the effect of the present disclosure may be contained in an amount of 0.5 to 2% by volume based on the total volume of the first positive electrode mixture layer.

Further, a diameter (D50) of the major axis of the flake graphite may be 2 to 4 μm, a diameter (D90) thereof may be 5 to 7 μm, and an aspect ratio (minor axis/major axis) of the flake graphite may be 0.2 to 0.6.

When the above-mentioned flake graphite is contained in the first positive electrode mixture layer close to the current collector, due to the structural characteristics of the flake graphite which has a high bonding force in the parallel direction and a low bonding force in the vertical direction low, and thus induce interlayer slicing even with a small force, it performs the role of lubrication during rolling. Therefore, since rolling of the first positive electrode mixture layer can be performed more easily, it is possible to reduce the stress concentration on the upper part of the electrode while minimizing the porosity, and improving the uniformity as a whole.

At this time, in order to maximize the above effects with the above content, a thickness ratio of the first positive electrode mixture layer and the second positive electrode mixture layer may be 5:5 to 9:1.

Meanwhile, each of the first positive electrode mixture layer and the second positive electrode mixture layer may further include a conductive material and a binder, and each of them may be contained in an amount of 0.01 to 2% by weight, based on the total weight of the respective positive electrode mixture layers.

According to another embodiment of the present disclosure, there is provided a secondary battery configured such that an electrode assembly including the positive electrode for secondary battery, a negative electrode, and a separator interposed between the positive electrode and the negative electrode is impregnated with an electrolyte solution, wherein the secondary battery may be a lithium secondary battery.

BRIEF DESCRIPTION OF THE DRAWINGS

FIG. 1 is a graph showing the porosity according to Experimental Example 1.

DETAILED DESCRIPTION OF THE EMBODIMENTS

Hereinafter, the present disclosure will be described in detail.

According to an embodiment of the present disclosure, there is provided a positive electrode for secondary battery comprising:
a first positive electrode mixture layer formed on at least one surface of a positive electrode current collector and including a first positive electrode active material; and
a second positive electrode mixture layer formed on the first positive electrode mixture layer and including a second positive electrode active material
wherein the first positive electrode active material and the second positive electrode active material include a lithium nickel-based transition metal oxide represented by the following Chemical Formula 1, and
wherein the first positive electrode mixture layer contains a flake graphite as an additive, $$Li_aNi_{1-b}M_bO_{2-x}A_x \quad (1)$$

in the above formula,
M is at least one selected from the group consisting of Ti, Mg, Al, Zr, Mn and Co,
A is an oxygen-substituted halogen,
$1.00 \leq a \leq 1.05$, $0 < b \leq 0.2$, and $0 \leq x \leq 0.01$.

As can be seen in Chemical Formula 1, the lithium nickel-based transition metal oxide is a lithium nickel-based transition metal oxide with high nickel content which contains Ni in a molar ratio of 0.8 or more.

More specifically, M may be Mn and Co, and specifically, may be lithium nickel manganese cobalt oxide represented by the following Chemical Formula 2.

$$Li_aNi_{1-b}(Mn_sCo_t)_bO_{2-x}A_x \quad (2)$$

in the above formula,
A is an oxygen-substituted halogen,
$1.00 \leq a \leq 1.05$, $0 < b \leq 0.2$, $0 \leq x \leq 0.01$, $0 \leq s \leq 1$, and $0 \leq t \leq 1$.

The lithium nickel-based transition metal oxide having high Ni content exhibits battery characteristics of high discharge capacity and thus is advantageous in realizing a high energy density, but there is a limit in increasing the electrode density.

Therefore, the lithium nickel-based transition metal oxide contained in the first positive electrode active material and the second positive electrode active material are configured such that large particles having a diameter (D50) of 10 to 19 μm and small particles having a diameter (D50) of 3 to 7 μm are mixed. That is, it may have a bimodal structure. In detail, the diameter (D50) of the large particles may be 13 to 18 μm, and the average diameter (D50) of the small particles may be 3 to 5 μm.

Here, the bimodal structure refers to a structure in which the peak is divided into two and measured when measured with a laser diffraction particle size measuring device. The peak on the larger diameter side indicates the presence of the large particles, and the peak on the smaller diameter side indicates the presence of the small particles.

When using a mixed structure of large particles and small particles as described above, due to the use of only large particles, the electrode density is reduced, the surface area is relatively reduced, so the resistance is increased, and it is difficult to reduce the diffusion resistance in the active material. When using only small particles, the surface area becomes large, and thus, it is possible to solve the problem in which side reactions with the electrolyte solution are easily performed, which is more preferable.

In this case, the large particles and the small particles may be mixed in a ratio of 7:3 to 9:1 based on the weight, and more specifically, may be mixed in a ratio of 7:3 to 8:2.

When the content of small particles is excessively increased beyond the above range, the problem of side reactions of the electrolyte solution becomes greater. When the content of small particles is excessively reduced, the packing property is decreased, the electrode density is decreased and the resistance is increased, which is not preferable.

Meanwhile, such a lithium nickel-based transition metal oxide may be contained in the first positive electrode mixture layer and the second positive electrode mixture layer in an amount of 97% to 99% by weight, based on the total weight of the respective positive electrode mixture layers.

The present disclosure aims at realizing a high energy density. Therefore, it is preferable to contain a large amount of the lithium nickel-based transition metal oxide with high Ni content, which exhibits a high discharge capacity.

When the lithium nickel-based transition metal oxide is contained in a smaller amount outside the above range, the capacity may be lowered, which is not preferable.

The content is based on the total weight of the positive electrode mixture layer, and when the positive electrode active material is used as a reference, only the above material may be used as the positive electrode active material.

Of course, in addition to the lithium nickel-based transition metal oxide of Chemical Formula 1, LiNiO$_2$, LiMnO$_2$, LiMn$_2$O$_2$, Li(Ni$_a$Co$_b$Mn$_c$)O$_2$ (0<a<0.8, 0<b<1, 0<c<1, a+b+c=1), LiNi$_{1-d}$Co$_d$O$_2$, LiCo$_{1-d}$Mn$_d$O$_2$, LiNi$_{1-d}$Mn$_d$O$_2$ (0.2<d<1), Li(Ni$_a$Co$_b$Mn$_c$)O$_4$ (0<a<2, 0<b<2, 0<c<2, a+b+c=2), LiMn$_{2-e}$Ni$_e$O$_4$, LiMn$_{2-e}$Co$_e$O$_4$ (0<e<2), LiCoPO$_4$, LiFePO$_4$ or the like may be mentioned, and one alone or a mixture of two or more of them may be further used in a small amount.

Further, according to the present disclosure, the total load amount of the first positive electrode mixture layer and the second positive electrode mixture layer for achieving a high energy density may be 3 to 8 mAh/cm$^2$.

As described above, when the electrode load amount is small, lowering the porosity was sufficient through a conventional rolling process. However, at a high load in the above range, the thickness of the electrode can inevitably be thick, and thus, the degree of rolling in the electrode can inevitably be different based on the thickness direction. Thus, there was a limit to minimizing the porosity and forming a uniform porosity throughout the electrode.

Thus, as a result of repeated in-depth studies, the present inventors have found that when the positive electrode mixture layer is formed into two layers, and a flake graphite is contained in the first positive electrode mixture layer close to the current collector, the flake graphite has a high bonding force in a parallel direction and a low bonding force in a vertical direction, which can induce interlayer slicing even with a small force, whereby it performs the role of a lubrication during rolling, thus facilitating the rolling of the first positive electrode mixture layer, and increasing the uniformity while reducing the overall porosity of the electrode even at high loads.

Here, the flake graphite may be contained in an amount of 0.5 to 5% by volume, specifically, 0.5 to 2% by volume relative to the total volume of the first positive electrode mixture layer.

When the flaky graphite is contained in a very small amount outside the above range, the effect intended by the present disclosure cannot be achieved, and when the flake graphite is contained in a very high amount, relatively the content of the positive electrode active material, the conductive material, the binder, etc. may be reduced, thus causing a decrease in capacity, which is not preferable.

In fact, according to the results confirmed by the present inventors, the effect of reducing the porosity can be exhibited from the time when the flaky graphite is contained in an amount of 0.5% by volume.

Further, the diameter (D50) of the major axis of the flake graphite may be 2 to 4 μm, and the diameter (D90) thereof may be 5 to 7 μm.

The above range is the most appropriate value for the positive electrode active material used in the present disclosure, considering the diameter (D50) of the lithium nickel-based transition metal oxide. In other words, since the lithium nickel-based transition metal oxide has a large particle diameter (D50) of 10 to 19 μm and a small particle diameter (D50) of 3 to 7 μm. Thus, by allowing the flake graphite to have a size similar to that of the small particles, it is located between the large particle active materials, and thus can more easily perform the role of lubrication, and consequently, it can further contribute to the improvement of an electrode density during rolling. Therefore, it is preferable to have the above range.

When the diameter is too large beyond the above range, it cannot be properly located between the large particles, the effect is reduced, and when the diameter is too small, there is a limit in performing the role of lubrication.

In this case, the "diameter Dn" as used herein means a diameter at a point where the cumulative distribution of the number of particles according to the particle size is n %. That is, the D50 is the diameter at a point where the cumulative distribution of the number of particles according to the particle size is 50%, and D90 is the diameter at a point where the cumulative distribution of the number of particles according to the particle size is 90%.

The Dn can be measured using a laser diffraction method. Specifically, after the powder to be measured is dispersed in a dispersion medium, it is introduced into a commercially available laser diffraction particle size measuring device (for example, Microtrac S3500) to measure the difference in the diffraction pattern according to the particle size when the particles pass through a laser beam, thereby calculating the particle size distribution. D10, D50, and D90 can be measured by calculating the particle diameters at points where the cumulative distribution of the number of particles according to the particle size in the measuring device is 10%, 50%, and 90%.

Moreover, the aspect ratio (minor axis/major axis) of the flake graphite may be 0.2 to 0.6. That is, for the same reason as described above, it is preferable that the flake graphite has a broad oval shape. Meanwhile, the thickness ratio of the first positive electrode mixture layer and the second positive electrode mixture layer may be appropriately selected in consideration of the porosity, the load amount and the like according to the rolling. Considering the capacity of the battery, it is preferable that the second positive electrode mixture layer is thick, whereas in order to increase the electrode density, rolling must be easily performed. Thus, the thickness of the first positive electrode mixture layer should occupy at least 50%, specifically, the thickness ratio may be 5:5 to 9:1, more specifically, 7:3 to 8:2. Further, the thickness ratio may be determined according to the load amount, and it is preferable that the thickness ratio of the first positive electrode mixture layer increases as the load amount increases.

When the thickness ratio of the first positive electrode material mixture layer is less than 50% outside the above range, the effect of reducing the porosity resulting from the application of the flake graphite layer is insignificant, and when the thickness ratio is too large, the capacity may be reduced, which is not preferable.

Each of the first positive electrode mixture layer and the second positive electrode mixture layer may further include a conductive material and a binder, in addition to the positive electrode active material and the flake graphite, and if necessary, may further include a filler.

The conductive material is used to impart conductivity to the electrode, and in the battery to be configured, the conductive material can be used without particular limitation as long as it does not cause chemical changes and has electronic conductivity. Specific examples include carbon-based materials such as carbon black, acetylene black, ketjen black, channel black, furnace black, lamp black, thermal black and carbon fiber; graphite such as natural graphite and artificial graphite; metal powder or metal fibers such as copper, nickel, aluminum and silver; conductive whiskey such as zinc oxide and potassium titanate; conductive metal oxides such as titanium oxide; or a conductive polymer such as a polyphenylene derivative, or carbon nanotube, and any one alone or a mixture of two or more of them may be used. In particular, it is preferable to use carbon nanotube, which is because the material has good conductivity, thereby being able to minimize the content of the conductive material. The conductive material may be contained in an amount of 0.5 to 2% by weight, specifically 0.5 to 1.5% by weight, based on the total weight of the respective positive electrode mixture layers.

The binder plays a role of improving adhesion between the positive electrode active material particles and adhesive strength between the positive electrode active material and the current collector. Specific examples include polyvinylidene fluoride (PVDF), vinylidene fluoride-hexafluoropropylene copolymer (PVDF-co-HFP), polyvinyl alcohol, polyacrylonitrile, carboxymethylcellulose (CMC), starch, hydroxypropylcellulose, regenerated cellulose, polyvinylpyrrolidone, polytetrafluoroethylene, polyethylene, polypropylene, ethylene-propylene-diene polymer (EPDM), sulfonated-EPDM, styrene butadiene rubber (SBR), fluororubber, or various copolymers thereof, and any one alone or a mixture of two or more of them may be used. The binder may be contained in an amount of 0.5 to 2% by weight, specifically 0.5 to 1.5% by weight, based on the total weight of the respective positive electrode mixture layers.

When the conductive material and the binder are contained in a very large amount beyond the above range, relatively the content of the positive electrode active material is reduced, which does not meet the purpose of the present disclosure of improving the capacity and energy density. When the conductive material and the binder are contained in a very small amount, it is difficult to exhibit conductivity and binding properties, which is not preferable.

The positive electrode current collector is not particularly limited as long as it has conductivity while not causing chemical changes to the battery, and for example, stainless steel, aluminum, nickel, titanium, calcined carbon, or a material formed by surface-treating a surface of aluminum or stainless steel with carbon, nickel, titanium, silver, or the like may be used. In addition, the positive electrode current collector may have a thickness of 3 µm to 500 µm, and may have fine irregularities formed on the surface thereof to increase the adhesion of the positive electrode active material. For example, it may be used in various forms such as films, sheets, foils, nets, porous bodies, foams, and nonwoven fabrics.

Meanwhile, according to another embodiment of the present disclosure, there is provided a secondary battery configured such that an electrode assembly including the positive electrode, a negative electrode, and a separator interposed between the positive electrode and the negative electrode is impregnated with an electrolyte solution.

Here, the secondary battery may specifically be a lithium secondary battery.

The negative electrode may also be manufactured in a form in which a negative electrode mixture including a negative electrode active material is coated onto a negative electrode current collector, and the negative electrode mixture may further include a conductive material, a binder and if necessary, a filler as described above, together with a negative electrode active material.

However, the content of the conductive material and the binder may be 0.5 to 10% by weight, respectively, and more specifically, may be 1 to 5% by weight.

As the negative electrode active material, a compound capable of reversibly intercalating and deintercalating lithium may be used. Specific examples thereof may include carbonaceous materials such as artificial graphite, natural graphite, graphitized carbon fibers and amorphous carbon; metallic compounds capable of alloying with lithium, such as Si, Al, Sn, Pb, Zn, Bi, In, Mg, Ga, Cd, Si alloy, Sn alloy or Al alloy; metal oxides capable of doping and undoping lithium, such as $SiO_x$ (0<x<2), $SnO_2$, vanadium oxide and lithium vanadium oxide; or a composite including the above metallic compound and the carbonaceous material such as a Si—C composite or a Sn—C composite, or the like, and any one or a mixture of two or more of them may be used. In addition, a metal lithium thin film may be used as the negative electrode active material. Further, both low crystalline carbon and high crystalline carbon may be used as the carbon material. Typical examples of the low crystalline carbon may be soft carbon and hard carbon. Typical examples of the high crystalline carbon may be amorphous, planar, flaky, spherical or fibrous natural or artificial graphite, Kish graphite, pyrolytic carbon, mesophase pitch based carbon fiber, meso-carbon microbeads, mesophase pitches, and high-temperature calcined carbon such as petroleum or coal tar pitch derived cokes.

The negative electrode current collector is not particularly limited as long as it has high conductivity without causing chemical changes to the battery. For example, copper, stainless steel, aluminum, nickel, titanium, calcined carbon, or a material formed by surface-treating a surface of copper or stainless steel with carbon, nickel, titanium, silver, or the like, aluminum-cadmium alloy, and the like may be used. In addition, the negative electrode current collector may generally have a thickness of 3 µm to 500 µm, and, like the positive electrode current collector, may have fine irregularities formed on the surface thereof to enhance the bonding strength of the negative electrode active material. For example, it may be used in various forms such as films, sheets, foils, nets, porous bodies, foams and nonwoven fabrics.

The separator separates the negative electrode and the positive electrode, and provides a passage for lithium ions to move. Any separator may be used without particular limitation as long as it is generally used as a separator in a lithium secondary battery. Particularly, a separator having excellent moisture-retention ability for an electrolyte while having low resistance to the migration of electrolyte ions is preferable. Specifically, a porous polymer film, for example, a porous polymer film made of polyolefin-based polymers such as ethylene homopolymer, propylene homopolymer, ethylene/butene copolymer, ethylene/hexene copolymer, and ethylene/methacrylate copolymer, or a laminated structure having two or more layers thereof may be used. In addition, a conventional porous nonwoven fabric, for example, a nonwoven fabric made of high melting point glass fiber, polyethylene terephthalate fiber, or the like may also be used. In addition, in order to secure heat resistance or mechanical strength, a coated separator containing a ceramic component or a polymer material may be used, and optionally, a single layer or a multilayer structure may be used.

In addition, the electrolyte solution used in the present disclosure may include, but is not limited to, an organic liquid electrolyte, an inorganic liquid electrolyte, a solid polymer electrolyte, a gel polymer electrolyte, a solid inorganic electrolyte, a molten inorganic electrolyte or the like which can be used in the preparation of a lithium secondary battery.

Specifically, the electrolyte solution may include an organic solvent and a lithium salt.

As the organic solvent, any solvent may be used without particular limitation as long as it can serve as a medium through which ions involved in the electrochemical reaction of the battery can move. Specifically, as the organic solvent, an ester-based solvent such as methyl acetate, ethyl acetate, γ-butyrolactone, or ε-caprolactone; an ether-based solvent such as dibutyl ether or tetrahydrofuran; a ketone-based solvent such as cyclohexanone; an aromatic hydrocarbon-based solvent such as benzene or fluorobenzene; a carbonate-based solvent such as dimethyl carbonate (DMC), diethylcarbonate (DEC), methylethylcarbonate (MEC), ethylmethylcarbonate (EMC), ethylene carbonate (EC), or propylene carbonate (PC); an alcohol-based solvent such as ethyl alcohol or isopropyl alcohol; nitriles such as R—CN (R is a straight, branched or cyclic C2-C20 hydrocarbon group, and may include a double-bond aromatic ring or ether bond); amides such as dimethylformamide; dioxolanes such as 1,3-dioxolane; or sulfolanes may be used. Among them, the carbonate-based solvent is preferable, and a mixture of a cyclic carbonate (e.g., ethylene carbonate, propylene carbonate, etc.) having high ionic conductivity and a high-dielectric constant, which may increase charge/discharge performance of the battery, and a low-viscosity linear carbonate-based compound (e.g., ethyl methyl carbonate, dimethyl carbonate, diethyl carbonate, etc.) may be more preferably used. In this case, when the cyclic carbonate and the chain carbonate are mixed and used in a volume ratio of about 1:1 to about 1:9, the electrolyte may exhibit excellent performance.

The lithium salt may be used without particular limitation as long as it is a compound capable of providing lithium ions used in a lithium secondary battery. Specifically, $LiPF_6$, $LiClO_4$, $LiAsF_6$, $LiBF_4$, $LiSbF_6$, $LiAlO_4$, $LiAlCl_4$, $LiCF_3SO_3$, $LiC_4F_9SO_3$, $LiN(C_2F_5SO_3)_2$, $LiN(C_2F_5SO_2)_2$, $LiN(CF_3SO_2)_2$, $LiCl$, $LiI$, $LiB(C_2O_4)_2$, or the like may be used as the lithium salt. It is preferable to use the lithium salt in a concentration rage of 0.1 to 2.0 M. If the concentration of the lithium salt is within the above range, since the electrolyte has an appropriate conductivity and viscosity, excellent electrolyte performance can be exhibited, and lithium ions can effectively move.

In order to improve the lifespan characteristics of the battery, suppress a reduction in battery capacity and improve discharge capacity of the battery, for example, one or more additives such as a halo-alkylene carbonate-based compound such as difluoroethylene carbonate, pyridine, triethylphosphite, triethanolamine, cyclic ether, ethylene diamine, n-glyme, hexaphosphoric triamide, a nitrobenzene derivative, sulfur, a quinone imine dye, N-substituted oxazolidinones, N,N-substituted imidazolidine, ethylene glycol dialkyl ether, an ammonium salt, pyrrole, 2-methoxy ethanol, or aluminum trichloride may be further added to the electrolyte solution in addition to the above electrolyte components. In this case, the additive may be included in an amount of 0.1% to 5% by weight based on the total weight of the electrolyte.

The secondary battery according to the present disclosure as described above may be used as a power source of devices in portable devices such as mobile phones, notebook computers, digital cameras, and electric vehicles such as hybrid electric vehicles (HEVs).

Hereinafter, embodiments of the present disclosure will be described in detail so that those skilled in the art can easily implement them. The present disclosure may be modified in various different ways, and is not limited to the embodiments forth herein.

Preparation Example 1

Raw materials such as $NiCl_2 \cdot 6H_2O$, $MnCl_2 \cdot 4H_2O$ and $CoCl_2 \cdot 6H_2O$ were mixed so that the molar ratio was Ni/Co/Mn=8:1:1, and $[Ni_{0.8}Co_{0.1}Mn_{0.1}](OH)_2$ precursor was grown by a co-precipitation method, and synthesized so that the diameter (D50) was 14.8 μm to match the size of the large particles.

The synthesized precursor was mixed with $LiOH \cdot H_2O$, and calcined at about 800° C. in an $O_2$ atmosphere to synthesize a final $Li[Ni_{0.8}Co_{0.1}Mn_{0.1}]O_2$ (D50: 15.2 μm).

Preparation Example 2

Raw materials such as $NiCl_2 \cdot 6H_2O$, $MnCl_2 \cdot 4H_2O$ and $CoCl_2 \cdot 6H_2O$ were mixed so that the molar ratio was Ni/Co/Mn=8:1:1, and $[Ni_{0.8}Co_{0.1}Mn_{0.1}](OH)_2$ precursor was grown by a co-precipitation method, and synthesized so that the diameter (D50) was 6.5 μm to match the size of the small particles.

The synthesized precursor was mixed with $LiOH \cdot H_2O$, and calcined at about 800° C. in an $O_2$ atmosphere to synthesize a final $Li[Ni_{0.8}Co_{0.1}Mn_{0.1}]O_2$ (D50: 6.8 μm).

Preparation Example 3

Second Positive Electrode Active Material Slurry

A positive electrode active material in which lithium nickel-based transition metal oxides of the large particles and the small particles prepared in Preparation Examples 1 and 2 were mixed in a ratio of 8:2, PVdF as a binder and carbon nanotube as a conductive material were used, and the positive electrode active material:thebinder:theconductive material were mixed well with NMP so as to have a weight ratio of 97.9:1.5:0.6. Thereby, a second positive electrode active material slurry was prepared.

Preparation Example 4

First Positive Electrode Active Material Slurry (A)

A positive electrode active material in which lithium nickel-based transition metal oxides of the large particles and the small particles prepared in Preparation Examples 1 and 2 were mixed in a ratio of 8:2, PVdF as a binder and carbon nanotube as a conductive material were used, and the positive electrode active material:thebinder:theconductive material were mixed well with NMP so as to have a weight ratio of 97.9:1.5:0.6. Then, a flake graphite (D50: 3.5 μm, D90: 6 μm, aspect ratio: 0.2) was added thereto and mixed at 0.5% by volume of the total volume of the solid content to prepare a first positive electrode active material slurry (A).

Preparation Example 5

First Positive Electrode Active Material Slurry (B)

A first positive electrode active material (B) was prepared in the same manner as in Preparation Example 4, except that flake graphite (D50: 3.5 μm, D90: 6 μm, aspect ratio: 0.2) was added and mixed at 1% by volume relative to the total volume of the solid content.

Preparation Example 6

First Positive Electrode Active Material Slurry (C)

A first positive electrode active material (C) was prepared in the same manner as in Preparation Example 3, except that a flake graphite (D50: 3.5 μm, D90: 6 μm, aspect ratio: 0.2) was added and mixed at 2% by volume relative to the total volume of the solid content.

Experimental Example 1

The active material slurries prepared in Preparation Examples 2 to 6 were respectively dried at 130° C. and pulverized to prepare a positive electrode powder. The packing density of the powder according to the pressure was measured, and the porosity relative to the true density was calculated, and the results are shown in Table 1 below.

The density and the porosity were measured and calculated as follows.

Density: Using a self-made cylindrical type powder molding jig and a compressor capable of measuring the height of the jig according to the weight and pressure, the volume of the powder according to the weight and pressure of the powder were measured and calculated, and the weight (density) of the powder per unit volume was calculated.

Porosity: The porosity according to the pressure was expressed by calculating the measured density and the true density of the solid content of the slurry powder as follows.

Porosity=(Measured density−True density of powder)/True density×100

TABLE 1

| | Pressure (Mpa) | Porosity according to the pressure of the slurry powder (%) |
|---|---|---|
| Preparation Example 3 | 0.13 | 41.71578 |
| | 0.25 | 38.0048 |
| | 0.38 | 35.16699 |
| | 0.5 | 32.32919 |
| | 0.63 | 29.92796 |
| Preparation Example 4 | 0.13 | 40.89317 |
| | 0.25 | 36.95271 |
| | 0.38 | 34.10683 |
| | 0.5 | 31.26095 |
| | 0.63 | 28.85289 |
| Preparation Example 5 | 0.13 | 40.73749 |
| | 0.25 | 37.00615 |
| | 0.38 | 33.93327 |
| | 0.5 | 31.29939 |
| | 0.63 | 28.6655 |
| Preparation Example 6 | 0.13 | 39.70848 |
| | 0.25 | 36.39576 |
| | 0.38 | 33.30389 |
| | 0.5 | 30.65371 |
| | 0.63 | 28.22438 |

Referring to Table 1, it was confirmed that when containing the flake graphite according to the present disclosure, the porosity can be lowered, and it was confirmed that as the content of the flake graphite increases, the porosity can be further lowered.

Example 1

The first positive electrode active material slurry (B) prepared in Preparation Example 5 was coated onto an Al foil having a thickness of 20 μm, and then dried at 130° C. to form a first positive electrode mixture layer, and then the second positive electrode active material slurry prepared in Preparation Example 3 was coated thereto and then dried at 130° C. to form a second positive electrode mixture layer, thereby preparing a positive electrode.

At this time, the thickness ratio of the first positive electrode mixture layer and the second positive electrode mixture layer was formed to be 1:2, and the total load amount of the electrode was formed to be 6 mAh/cm².

Example 2

The first positive electrode active material slurry (B) prepared in Preparation Example 5 was coated onto an Al foil having a thickness of 20 μm, and then dried at 130° C. to form a first positive electrode mixture layer, and then the second positive electrode active material slurry prepared in Preparation Example 3 was coated thereto and then dried at 130° C. to form a second positive electrode mixture layer, thereby preparing a positive electrode.

At this time, the thickness ratio of the first positive electrode mixture layer and the second positive electrode mixture layer was formed to be 1:1, and the total load amount of the electrode was formed to be 6 mAh/cm².

Comparative Example 1

The active material slurry (B) prepared in Preparation Example 5 was coated onto an Al foil having a thickness of 20 μm, and then dried at 130° C. to form a positive electrode, and the load amount of the electrode was formed to be 6 mAh/cm².

Comparative Example 2

The positive electrode active material slurry (B) prepared in Preparation Example 3 was coated onto an Al foil having a thickness of 20 μm, and then dried at 130° C. to form a positive electrode, and the load amount of the electrode was formed to be 6 mAh/cm².

Experimental Example 2

When the positive electrodes prepared in Examples 1 and 2, and Comparative Examples 1 and 2 were subjected to the same pressure using a Roll Press, the changes in the porosity are shown in Table 2. When a flake graphite was contained in the entire positive electrode as in Comparative Example 1, and when a flake graphite was not contained as in Comparative Example 2, the difference in porosity was confirmed. When the proportion of the first positive electrode mixture layer containing a flake graphite was 50% as in Example 2, it was confirmed that the porosity can be lowered similarly to the case of including the entire electrode. Then, when the thickness of the rolled electrode was measured and the capacity per unit volume of the electrode prepared in each Example and Comparative Example was calculated and compared, it was confirmed that it was effective in reducing the porosity even if the first positive electrode mixture layer to which flake graphite was added was not included in the entire electrode and applied at a thickness of 50% as a lower layer and it was effective in increasing the capacity per unit volume of the electrode. That is, according to the present disclosure, it can be seen that even with a small amount of flake graphite, it shows an increase in capacity per unit volume that is as good as that of using a large amount of flaky graphite as a whole (Comparative Example 1).

TABLE 2

|  | Porosity (%) | Electrode load (mAh/cm$^2$) | Electrode unit capacity per volume (mAh/cm$^3$) |
|---|---|---|---|
| Example 1 | 25 | 6 | 708.8 |
| Example 2 | 23 | 6 | 727.7 |
| Comparative Example 1 | 23 | 6 | 727.7 |
| Comparative Example 2 | 28 | 6 | 680.7 |

The invention claimed is:

1. A positive electrode for secondary battery comprising:
a first positive electrode mixture layer formed on at least one surface of a positive electrode current collector and including a first positive electrode active material; and
a second positive electrode mixture layer formed on the first positive electrode mixture layer and including a second positive electrode active material,
wherein the first positive electrode active material and the second positive electrode active material include a lithium nickel-based transition metal oxide represented by the following Chemical Formula 1, and
wherein only the first positive electrode mixture layer contains a flake graphite as an additive, and the second positive electrode mixture layer does not contain a flake graphite:

$$Li_aNi_{1-b}M_bO_{2-x}A_x \qquad (1)$$

in the above formula,
M is at least one selected from the group consisting of Ti, Mg, Al, Zr, Mn and Co,
A is an oxygen-substituted halogen,
$1.00 \leq a \leq 1.05$, $0 < b \leq 0.2$, and $0 \leq x \leq 0.01$.

2. The positive electrode for secondary battery according to claim 1, wherein
the lithium nickel-based transition metal oxide of the first positive electrode active material and the second positive electrode active material is configured such that large particles having a diameter (D50) of 10 to 19 μm and small particles having a diameter (D50) of 3 to 7 μm are mixed.

3. The positive electrode for secondary battery according to claim 2, wherein the large particles and the small particles are mixed in a ratio of 7:3 to 9:1 based on the weight.

4. The positive electrode for secondary battery according to claim 1, wherein in the first positive electrode mixture layer and the second positive electrode mixture layer, the lithium nickel-based transition metal oxide is contained in an amount of 97% to 99% by weight based on the total weight of the respective positive electrode mixture layers.

5. The positive electrode for secondary battery according to claim 1, wherein a total load amount of the first positive electrode mixture layer and the second positive electrode mixture layer is 3 to 8 mAh/cm$^2$.

6. The positive electrode for secondary battery according to claim 1, wherein the flake graphite of the first positive electrode mixture layer is contained in an amount of 0.5 to 2% by volume based on the total volume of the first positive electrode mixture layer.

7. The positive electrode for secondary battery according to claim 1, wherein a diameter (D50) of the major axis of the flake graphite is 2 to 4 μm, and a diameter (D90) thereof is 5 to 7 μm.

8. The positive electrode for secondary battery according to claim 1, wherein an aspect ratio (minor axis/major axis) of the flake graphite is 0.2 to 0.6.

9. The positive electrode for secondary battery according to claim 1, wherein a thickness ratio of the first positive electrode mixture layer and the second positive electrode mixture layer is 5:5 to 9:1.

10. The positive electrode for secondary battery according to claim 1, wherein each of the first positive electrode mixture layer and the second positive electrode mixture layer further includes a conductive material and a binder, and each of them is contained in an amount of 0.01 to 2% by weight, based on the total weight of the respective positive electrode mixture layers.

11. A secondary battery configured such that an electrode assembly including the positive electrode for secondary battery of claim 1, a negative electrode, and a separator interposed between the positive electrode and the negative electrode is impregnated with an electrolyte solution.

12. The secondary battery of claim 11, wherein the secondary battery is a lithium secondary battery.

* * * * *